March 28, 1944.  A. J. MONACK  2,345,278
METHOD OF SEALING GLASS TO IRON
Filed Feb. 2, 1942
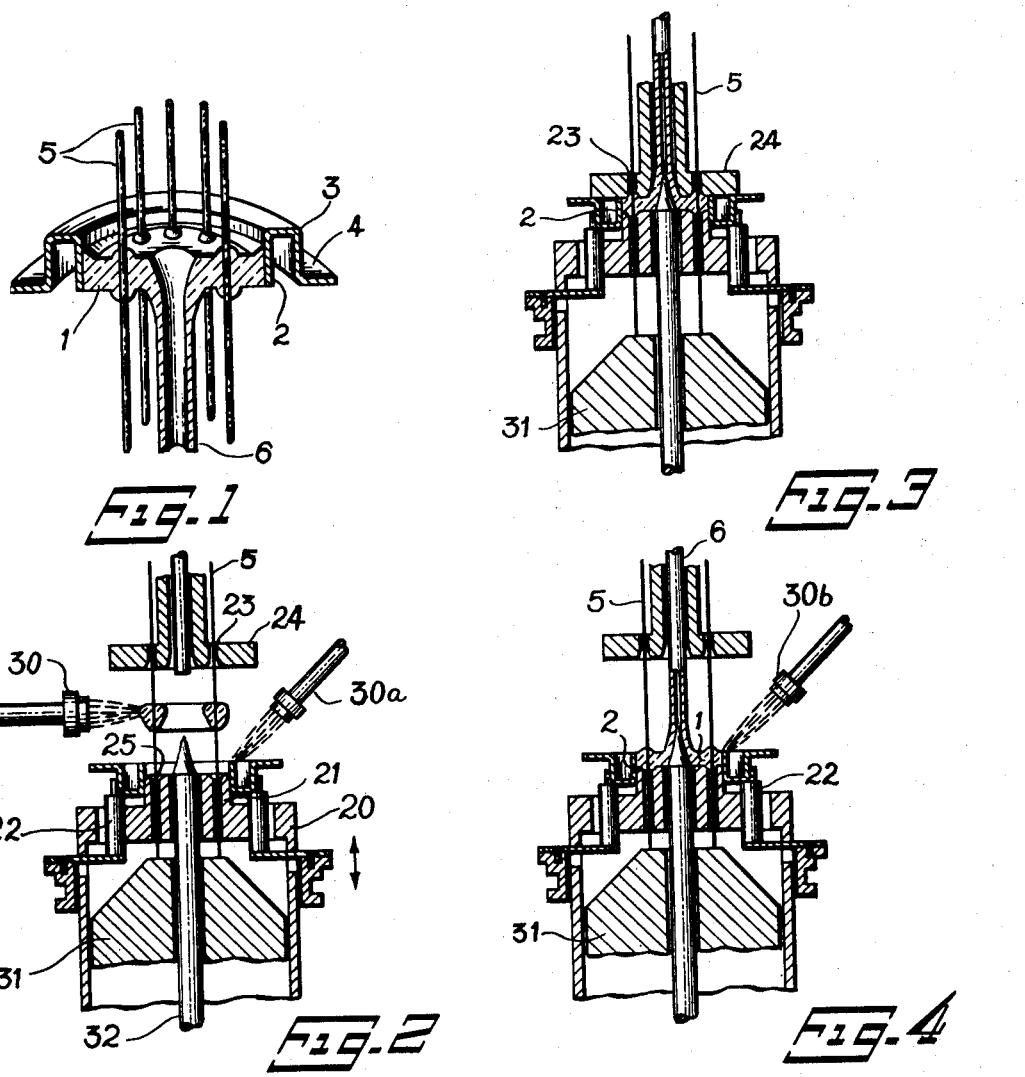
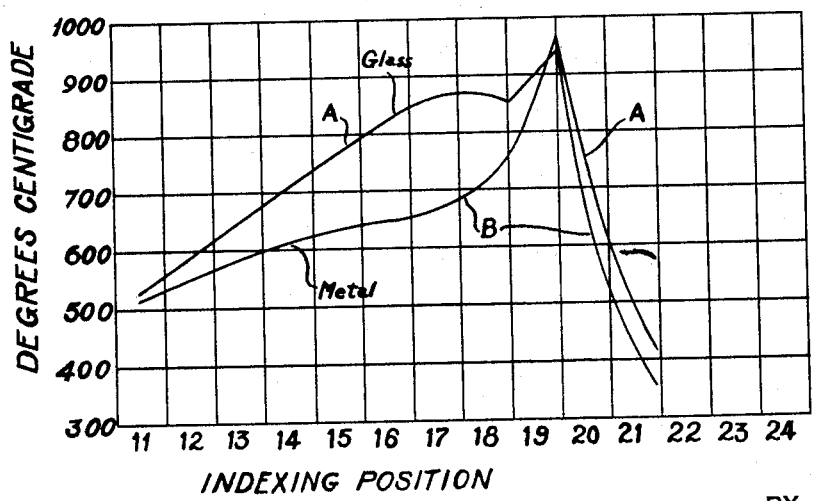
INVENTOR
Albert J. Monack.
BY Charles McClair.
ATTORNEY Patented Mar. 28, 1944

2,345,278

UNITED STATES PATENT OFFICE 2,345,278

METHOD OF SEALING GLASS TO IRON

Albert J. Monack, New York, N. Y., assignor to Radio Corporation of America, a corporation of Delaware Application February 2, 1942, Serial No. 429,171

8 Claims. (Cl. 49—81)

My invention relates to glass-to-metal seals, particularly to hermetic glass-to-metal seals of the type used in envelopes for electron discharge devices and the like.

The bond obtained between iron and the low melting glass or enamel commonly used in industry is not satisfactory in radio tube envelopes because the bond is not gas-tight and is mechanically weak. Further, the glass of such seals does not have the necessary electrical properties for insulating conductors which must carry high voltage high frequency currents and which may operate at relatively high temperatures. The sealing of steel or iron directly to a coherent solid glass body has heretofore been impractical and a bond could be obtained only by fluxing the iron surface, as with borax or other compounds which would combine with or reduce the iron oxide before the glass body is applied, or alternatively by preventing the formation of iron oxide with a plating on the iron of a non-oxidizable metal such as silver. Silver plated iron for glass seals is described in detail in the copending application of Miller and Spooner, Serial No. 414,148, filed October 8, 1941, and which issued as Patent No. 2,334,020, Nov. 9, 1943, and is assigned to the assignee of this application.

The object of my invention is an improved method of sealing glass directly to oxidizable metals, such as steel or iron, to produce seals that are gas-tight, mechanically strong and have good electrical insulating properties.

Another object of my invention is an iron-to-glass seal which may be made commercially and which may be used, for example, in envelopes of radio tubes and the like.

The characteristic features of my invention are defined in the appended claims and one embodiment is described in the following specification and illustrated in the accompanying drawing in which Figure 1 shows in section an iron-to-glass seal structure, particularly useful for vacuum-tight metal envelopes of radio tubes and the like;

Figures 2, 3 and 4 show essential parts of one type of apparatus for making the seal structure in Figure 1, these three figures showing essential steps in making the seal, and Figure 5 shows a graph of the rise and fall of the metal and glass temperature during my novel sealing operation.

The particular glass-to-metal seal assembly described here and shown in Figure 1 comprises a round glass disc or button 1 sealed to a metal ring 2, which comprises a part of the metal annulus 3, U-shaped in cross section, and having an outwardly extending flange 4 to which a metal envelope may be welded. Lead wires 5 for electrodes within the envelope pass through the button and are arranged in a circle concentric with and around the exhaust tube 6 at the center of the button.

A machine for making the header of Figure 1 is more fully described in the Franke Patent 2,195,483 of April 2, 1940, and comprises, as shown in Figures 2 and 3, a press mold for molding the glass into the metal ring 2 and around the lead wires. The molds are preferably rotated in gas flames to uniformly heat the glass and metal of the seal and, preferably, a number of the press mold assemblies are mounted on the periphery of a rotating turret or dial which indexes step-by-step to bring the molds with the glass and metal parts of the stem successively into registry with the gas flames spaced around the turret. The press mold assembly comprises a plate 20 having on its upper side a raised round portion or forming block 21 with an outside diameter to snugly engage the inner surface of the ring 2, the forming block having sufficient height to extend through the ring 2. The inner surface of the ring may thus be protected from direct flames while the glass is being softened. Pins 22 are provided for raising the upper edge of the ring above the top of the forming block as shown in Figure 2 to form a round saucer-shaped receptacle into which the molten glass may be pressed. The ring in its lowered position may thus be maintained at a relatively low temperature, preferably below the oxidizing temperature of the ring and until the glass is thoroughly softened and at sealing temperature. Thereupon the ring is raised and, with the aid of hard pointed flames, is quickly heated to the sealing temperature and the glass is pressed into the ring. The lead-in wires 5 are positioned in registering holes 23 and 25 in the forming block and press block 24, the press block being mounted to reciprocate vertically along the wires.

The necessary mass of glass for the button is supplied in the form of a glass ring set upon the forming block and is heated by horizontal gas burners 30 positioned to play upon the glass ring as it revolves with the mold. As the glass softens it flows in and around the lead wires and joins to the wires to form an annular plastic mass. By raising the plunger 31 the lead wires 5 and the attached glass annulus may be raised a sufficient distance above the forming block to prevent excessive heating of the ring 2. Pins 22 are then moved upwardly to raise the iron ring 2 above the mold and to expose the ring to the hard pointed flames of the inclined burner 30a. When the ring reaches sealing temperature, the plunger 31 is lowered and with the downward movement of the press block 24 the molten glass is flattened and squeezed against the inner surface of the ring. At the same time, plunger 32 with its pointed upper end is raised to clear the opening through the exhaust tube junction. Best results have been obtained by immediately withdrawing the press block to prevent chilling and cracking of the glass.

The principal feature of my improved method, which has been found to permit the sealing of commercial glass directly to iron or steel, comprises the step of heating the metal to a temperature considerably above the sealing temperature immediately after the seal is made. The completed header assembly is raised slightly above the forming block 21 and, with the press block 24 retracted, high temperature or "hard" pointed flames 30b are directed upon the outer surface of the metal ring opposite the glass-to-metal seal region. The flame of burner 30b may be made sufficiently hot for the purpose of my invention by mixing ordinary illuminating gas with oxygen. The flame of a commercial acetylene gas welding torch may be used. In any case the flame should be so hot and be so directed on the ring 2 as to raise the ring to incandescence and thus heat the seal between the iron ring and the rim of the glass disc within a time short enough to prevent softening and deformation of the disc. I have found that the ring and the glass in the immediate region of the seal between the ring and the glass may be raised quickly to a temperature considerably above the temperature at which the glass seals to the lead wires without affecting the lead wire seals. The relatively low thermal conductivity of glass of course facilitates this sudden high temperature heating of the seal region without materially deforming the body of the glass disc. If desired, the glass disc may be performed, pressed against the metal, the contacting area of the glass and metal heated to sealing temperature, and the seal region then heated to a temperature considerably above the sealing temperature of the glass. This procedure is useful in sealing a glass disc header, with attached electrodes, directly into the end of a cup-shaped metal shell. A flared or cone-shaped seal in the shell for the disc facilitates a uniform strong seal.

Good results have been obtained in making headers of the type shown in Figure 1 on machines having twenty-four press mold assemblies indexing step-by-step to bring the molds to rest for a period of about six seconds in each indexing position. Different numbers of molds and different speeds could, of course, be used. The header rings 2 are of cold drawn steel about .680 inch in diameter and .010 inch thick and are thoroughly degreased and cleaned. One particular glass used with success is commercial "G-12" lead glass having the chemical composition, in parts by weight,

| | |
|---|---|
| Silicon dioxide | 57 |
| Lead oxide | 28 |
| Potassium oxide | 3.5 |
| Sodium oxide | 5 |
| Alumina | 1.44 |
| Iron oxide | .06 |

With an indexing period of six seconds for the machine having twenty-four mold assemblies, one successful firing schedule is here described.

The first seven or eight positions of the machine are used for loading the glass rings, lead wires and metal rings to the press molds and, if desired, mild preheating may be employed in the eighth and ninth positions. In the tenth position hard fires are first played upon the glass.

The average temperature of the glass and of the metal in the various positions on the machine is indicated by the graph in Figure 5 where the abscissa, or time axis, is laid out in terms of indexing positions and where each vertical line marks the end of the indexing position numbered at the lower end of the line. Curve A shows the average temperature of the glass in the various positions, while curve B shows the temperature of the metal ring 2, the temperature in each position being the average temperature as observed by an optical pyrometer. On a machine with an overall indexing period of six seconds, the traveling time between one position and the next is less than one second, and the drop in temperature of the glass and metal during indexing may be neglected. The temperature of the "G-12" glass is gradually raised from a preheat temperature of about 500° in the tenth position to about 850° in the eighteenth position. As the mold enters the eighteenth position the ring 2 is raised upwardly on the press blocks 21 by pins 22 and the hard pointed flames of burner 30a are applied to the rim of the ring 2. Consistently good results have been obtained by bringing the ring to about 750° C. and pressing the 850° glass into the ring and thereby sealing the glass to the metal while the stem moves from the eighteenth to the nineteenth position. The downward and upward movement of the press block may be completed while the machine is indexing so that the glass may remain in contact with the press blocks of the molds for only a fraction of a second and hence prevent the glass from being appreciably chilled. While 850° C. appears from tests to be the optimum temperature at which the "G-12" glass should be sealed into an iron or steel ring, the sealing temperature may for this particular glass be as low as 830° C. Below about 830° C. the "G-12" glass is more viscous than desired for high speed sealing. The higher the temperature, the more fluid is the glass, of course, but little advantage is obtained in raising the glass temperature above about 860°. It is noted that the optimum sealing temperature of "G-12" glass is about 200° above the "softening point" of the glass. It is found my novel sealing method is particularly applicable to glass-to-iron seals in which glasses have a softening point between about 600° C. and 650° C. The softening point of glass is the temperature in centigrade at which a fiber of the glass .55 to .75 millimeter in diameter and 23.5 centimeters long will elongate under its own weight at the rate of 1 millimeter per minute. This temperature for all glasses is the temperature at which log₁₀ viscosity = 7.65. The softening points as defined above for commercial "soft" glasses that are useful in my seal and that may be sealed within about the same temperature range as "G-12" glass are—

| | °C. |
|---|---|
| G-1 | 626 |
| G-12 | 630 |
| 814 KW | 627 |
| 125 AJ | 652 |

In the nineteenth position, according to the characteristic feature of my invention, the high temperature pointed flame of burner 30b is applied to the outer surface of the metal ring 2 and the temperature of the ring and the immediately adjacent layer of glass is raised from the sealing temperature to about 975° C. Tests indicate that good seals may be made between the commercial "G-12" glass and iron when heated, after sealing, to any temperature between 915° and 1020° C., or to a temperature at least ten percent higher than the sealing temperature of the glass to the iron. If the completed seal is heated to less than about 915° C. the seals may pass air and are not reliable for radio tube uses, whereas if iron or steel is heated above about 1020° C. there is evidence of burning and deep corrosion of the ring.

It has been found desirable to press the glass a second time in the mold while the molds move from the nineteenth to the twentieth position. In the twentieth position all fires are removed and the stem is permitted to cool rapidly to 500 or 600° C.

In the twenty-first and twenty-second positions the glass and metal parts of the header are partly annealed and permitted to cool to below the strain point of the glass, as more fully described in the copending application of Miller and Spooner, supra. In the twenty-third or twenty-fourth position the finished stem is removed from its mold.

I am not certain why the glass-to-metal seals of headers produced according to the particular firing schedule above described are mechanically strong and gas-tight, but it is my belief that the high temperature treatment of the metal ring after the seal has been made in he nineteenth position causes a solution or diffusion of a portion of the iron oxide on the inner surface of the ring into the glass. In a seal made according to my invention, a layer about .00002 inch thick is seen on the iron which appears, under a microscope with an optical amplification of about 1000 diameters, to be iron oxide. This layer, however, is about .0002 inch thick in the seal when made with the same materials and firing schedule, but without the high temperature firing to considerably above sealing temperature after the seal is made, as in the nineteenth position. This thick layer is not gas-tight and is mechanically weak and is unusable in radio tube manufacture. The seal region after my novel firing schedule appears to be graded, with lead glass at one boundary merging into lead glass high in iron oxide, and then into pure iron oxide and finally into iron at the other. The seals are mechanically strong and vacuum-tight and may be made at the high speeds necessary for factory production. The glass of the stems made according to my invention has a high dielectric constant and does not produce the electrical loss characteristic of glasses sealed in the usual way with metals and impregnated considerable distances inward from the seal region with oxides of the metals.

I claim:

1. The method of making a strong hermetic seal between glass and a readily oxidizable metal, comprising heating the metal and the glass to only the molding and sealing temperature of the glass, pressing the softened glass against the metal and then directly heating only the metal to a temperature about 10% above the sealing temperature of the glass.

2. The method of sealing an iron body to a glass body comprising heating the glass body to sealing temperature and the iron body to a temperature about 100° C. lower than said glass sealing temperature, then immediately pressing the hot glass body against the iron body and at the same time molding the glass body to the desired shape, and finally applying heat directly to the iron body only and thereby heating the iron body and the immediately adjacent layer of glass to a temperature between at least 100° C. above said glass sealing temperature and about 1020° C.

3. The method of making a composite glass and metal assembly comprising separately heating the glass and metal to sealing temperature, pressing the glass and metal together, and then applying heat directly to the metal only and thereby heating it to a temperature about 10% higher than said sealing temperature and below 1020° C.

4. The method of sealing a steel ring to the edge of a disc of glass having a softening point between about 600° C. and 650° C., comprising heating the glass to about 830° C., heating the ring to about 750° C., molding the glass into a disc and pressing the edge of the disc against the inner surface of the ring, and finally applying heat directly only to the ring to heat it to a temperature between about 915° C. and 1020° C.

5. The method of sealing an iron body to a glass body having the glass working characteristics of glass having a softening point of about 630° C. comprising heating said glass body and iron body to sealing temperature, pressing the two hot bodies together to seal the glass to the iron and then applying heat to the iron body only and thereby heating it to a temperature about 10% higher than said sealing temperature and below 1020° C.

6. The method of sealing a metal body to a glass body having the glass working characteristics of glass having a softening point of about 630° C. comprising heating said glass body to a sealing temperature between about 830° and 860° C. and heating said metal body to about 750° C., joining said heated bodies in a seal, and further applying heat only to the metal body to raise it to a temperature between 915° C. and 1020° C. to perfect the seal.

7. The method of sealing the periphery of a glass disc to the inner surface of an iron ring, the glass disc having the glass working characteristics and the approximate softening point of a glass having a composition, by weight, 57 parts silicon dioxide, 28 parts lead oxide, 3.5 parts potassium oxide, 5 parts sodium oxide, 1.44 parts aluminum oxide, and .06 part iron oxide, comprising heating the iron ring and the glass to sealing temperature molding the glass into a disc and pressing the hot rim of the disc against the hot inner surface of the iron ring and thereby sealing the glass to said surface, and then applying heat to the iron ring only to raise it and the adjoining glass to a temperature about 10% above said sealing temperature.

8. The method of sealing a coherent glass body to the inner surface of an oxidizable metal ring, comprising heating the metal ring and the entire glass body to sealing temperature, molding the glass body while at sealing temperature to the desired shape and pressing it against said inner surface of the ring, and then suddenly applying heat directly to said ring only and thereby heating the ring and the glass adjoining said surface to a temperature about 10% higher than said sealing temperature and below 1020° C. and continuing the heating until the seal is vacuum-tight.

ALBERT J. MONACK.